July 1, 1930. LE ROY J. THOMPSON 1,769,477

SAFETY PIN

Filed July 5, 1929

INVENTOR
LeRoy J. Thompson
BY Chappell & Earl
ATTORNEYS

Patented July 1, 1930

1,769,477

UNITED STATES PATENT OFFICE

LE ROY J. THOMPSON, OF GRAND RAPIDS, MICHIGAN

SAFETY PIN

Application filed July 5, 1929. Serial No. 375,901.

The main object of this invention is to provide a safety pin in which the tip of the pin is normally protected, even when released from its keeper.

Objects pertaining to details and economies of my invention will definitely appear from the description to follow. The invention is defined in the claims.

A device embodying the features of my invention is clearly illustrated in the accompanying drawing, in which—

Figure 1:
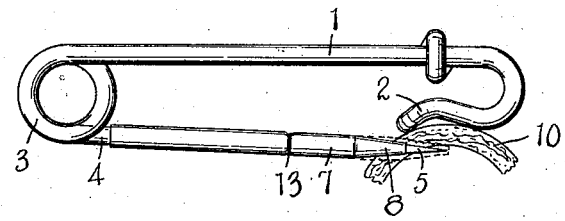
Fig. 1 is a side view of my improved safety pin showing the position of the guard when the pin is being inserted through a garment.

The embodiment of my invention illustrated comprises a body member 1 formed into or provided with a keeper 2 at one end and having a spring coil 3 at its other end. The pin 4 is carried by this coil and in the embodiment illustrated is formed integrally therewith. The pin has a relatively long tapered point or tip portion 5 and a reduced portion 6 of substantial length.

Figure 2:
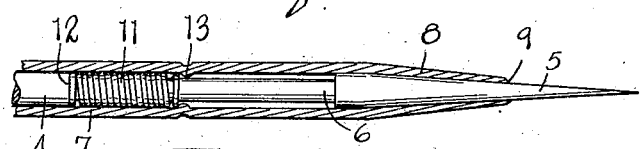
Fig. 2 is an enlarged detail view with the guard in longitudinal section and in retracted position.
Figure 3:
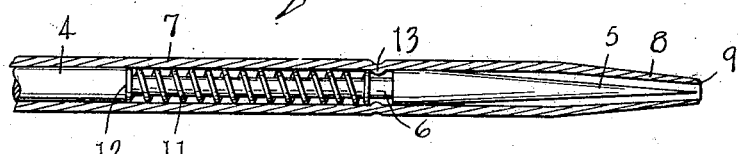
Fig. 3 is a similar detail section with the guard in projected position

The guard 7 is sleeved upon the pin for sliding movement and is provided with a tapered portion 8 at its tip adapted when the guard is retracted to closely fit the base portion of the tapered tip, the guard terminating in a beveled edge 9 at its forward end. When the guard is retracted as shown in Figs. 1 and 2 the tapered portion of the guard closely fits the tapered tip exposing the point of the tip, but in effect constituting a complementary part thereof so that when the pin is being inserted through a piece of fabric, as indicated at 10, the guard is pushed back on the tip to expose the point of the tip and the tapered portion of the guard follows the exposed point of the tip through the fabric.

The guard is held normally in its projected position by means of the coiled spring 11 which is arranged on the reduced portion of the pin with its inner end engaging the shoulder 12 and its outer end engaging the internal annular bead 13 which is formed by striking in an annular portion of the sleeve.

My improved pin is especially desirable for use on the clothing of babies as they are not injured even though the pin should become disengaged from its keeper.

I have illustrated and described a very practical embodiment of my invention. I have not attempted to illustrate certain modifications which I contemplate as it is believed that this disclosure will enable those skilled in the art to embody or adapt my improvements as may be desired.

The spring may be omitted and the guard may be adjusted manually. Of course, the entire advantage of the resilient action of the spring would then be wanting, but the structure would be of considerable value merely as an adjustable guard.

Having thus described my invention what I claim as new and desire to secure by Letters Patent is:

1. In a safety pin, the combination of a body member provided with a keeper at one end and a spring coil at the other, a pin having a uniformly tapered tip portion of substantial length carried by said coil and adapted to be engaged with said keeper, said pin having a reduced portion of substantial length at the rear of its tapered tip portion, a spring arranged on said reduced portion of said pin and seating against the shoulder at the inner end thereof, and a tubular guard slidable on said pin and having a tapered tip adapted when the guard is retracted to fit the base portion of the tapered tip of the pin with the tip of the guard in close engagement with the pin, said guard having an indentation constituting a thrust shoulder for the outer end of the spring.

2. In a safety pin, the combination of a body member provided with a keeper at one end and a spring coil at the other, a pin having a uniformly tapered tip portion of substantial length carried by said coil and adapted to be engaged with said keeper, a tubular guard slidable on said pin and having a tapered tip adapted when the guard is retracted to fit the base portion of the tapered tip of the pin with the tip of the guard in close engagement with the pin, and a spring arranged within said guard and acting to normally project the same over the tip of the pin.

3. In a safety pin, the combination of a body member provided with a keeper at one end and a spring at the other, a pin carried by said spring to be engaged by said keeper and having a tapered tip portion of substantial length, a tubular guard slidable on said pin and having a tapered tip portion adapted when the guard is in retracted position to complement the exposed portion of the tip of the pin, and a spring arranged within said guard and acting to normally project the same over the tip of the pin.

4. In a safety pin, the combination of a body member provided with a keeper at one end and a spring at the other, a pin carried by said spring to be engaged by said keeper and having a tapered point portion, a tubular guard slidable on said pin and having a tapered end portion adapted when the guard is in retracted position to complement the exposed portion of the point of the pin, and adapted to guard the point when the pin is in use and engaged by the keeper.

In witness whereof I have hereunto set my hand.

LE ROY J. THOMPSON.